United States Patent
Dillard et al.

[15] 3,677,508
[45] July 18, 1972

[54] FOLDING DEPLOYABLE PANEL STRUCTURE HAVING ROLL-UP RETAINING SPRING FOR STOWAGE

[72] Inventors: Paul A. Dillard, Littleton, Colo.; Donald R. Baker, Lawndale, Calif.

[73] Assignee: TRW Inc., Redondo Beach, Calif.

[22] Filed: Sept. 21, 1970

[21] Appl. No.: 73,884

[52] U.S. Cl. ............................................. 244/1 SS, 52/108
[51] Int. Cl. .......................................................... B64g 1/30
[58] Field of Search ..................... 52/64, 71, 108, 109, 110; 343/705 S, 915; 244/1 SS

[56] References Cited

UNITED STATES PATENTS

| | | | |
|---|---|---|---|
| 3,094,439 | 6/1963 | Mann et al. | 136/89 |
| 3,204,889 | 9/1965 | Schwinghamer | 244/1 |
| 3,300,162 | 1/1967 | Maynard et al. | 244/1 |
| 3,326,497 | 6/1967 | Michelson | 244/1 |
| 3,459,391 | 8/1969 | Haynos | 244/1 UX |
| 3,477,662 | 11/1969 | Anderson | 244/1 SS |
| 3,525,483 | 8/1970 | Van Alstyne | 244/1 SS |
| 3,532,299 | 10/1970 | Williamson et al. | 244/1 SS |

*Primary Examiner*—Dennis L. Taylor
*Attorney*—Daniel T. Anderson, Donald R. Nyhagen and Jerry A. Dinardo

[57] ABSTRACT

A deployable folding panel structure for a spacecraft solar array and other uses having a folding panel which is extendable from a folded stowed configuration to a flat unfolded deployed configuration, and self-coiling panel retaining springs which are held flat against the folded panel sections in stowed configuration to retain the panel sections firmly in position and are released at the start of deployment to roll up or coil by elastic strain energy to retracted positions wherein the springs clear the panel for extension to deployed configuration.

9 Claims, 9 Drawing Figures

Patented July 18, 1972  3,677,508

Paul A. Dillard
Donald R. Baker
INVENTOR.

BY

ATTORNEY

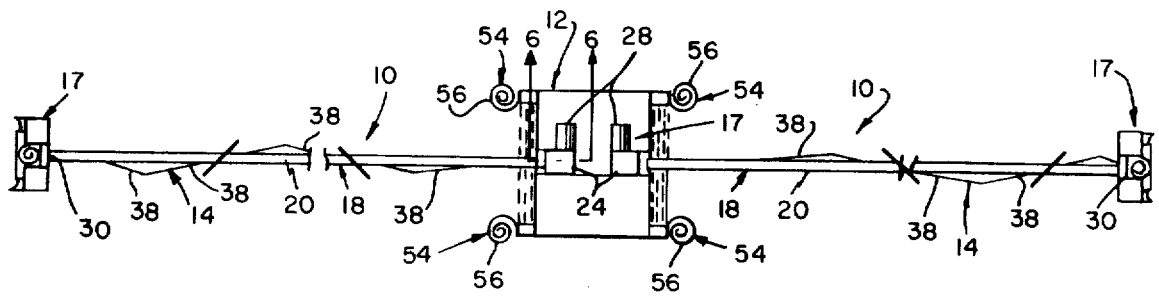
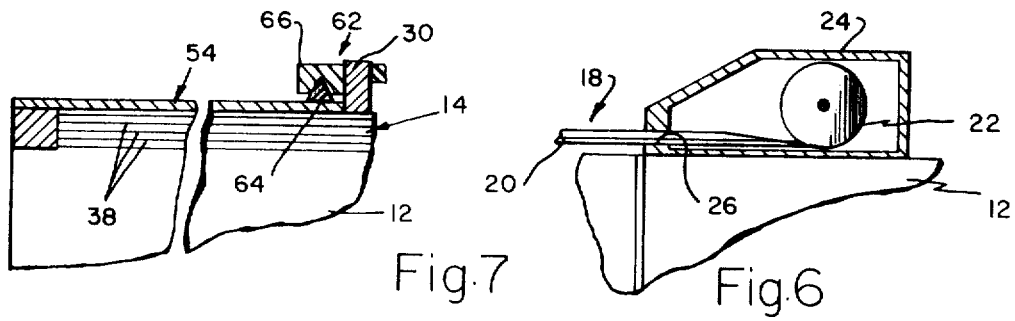
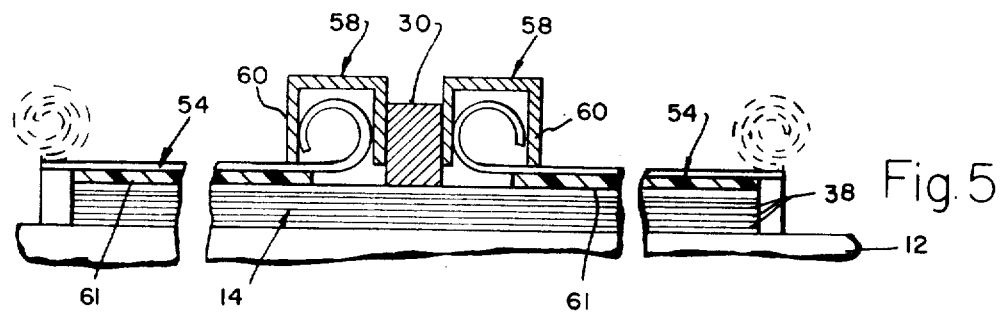
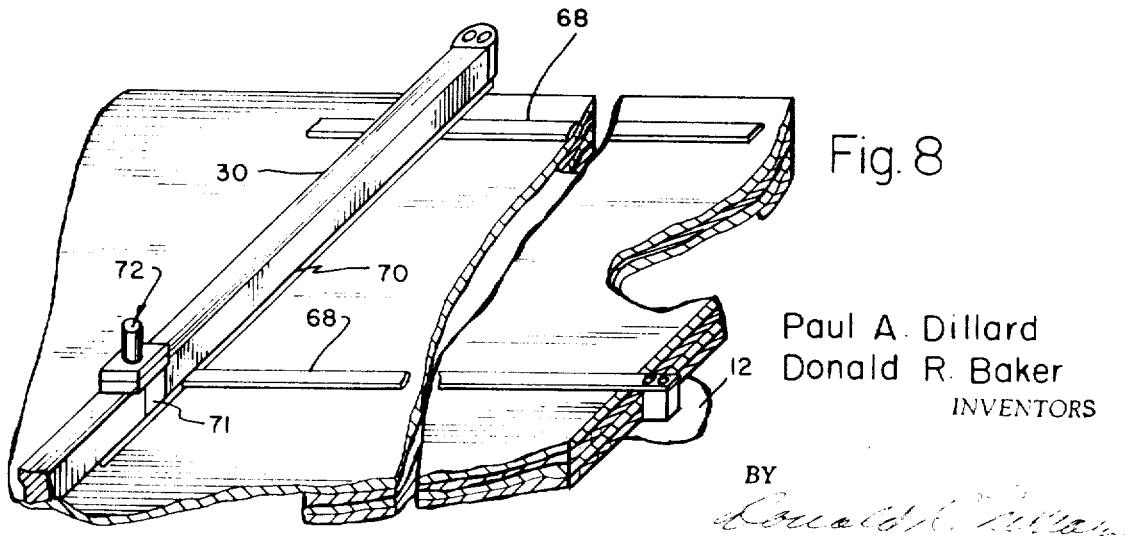
Paul A. Dillard
Donald R. Baker
INVENTORS

FOLDING DEPLOYABLE PANEL STRUCTURE HAVING ROLL-UP RETAINING SPRING FOR STOWAGE

BACKGROUND OF THE INVENTION

1. Field of the Invention

This invention relates generally to deployable structures and more particularly to a deployable folding panel structure for spacecraft solar arrays and other uses embodying novel self-coiling panel retaining springs for retaining the folding panel of the panel structure in a folded stowed configuration.

2. Prior Art

As will appear from the ensuing description, the deployable panel structure of the invention may be utilized in an antenna, solar array, and other applications. The panel structure will be disclosed in connection with its use in a deployable solar array for a spacecraft. Deployable solar arrays with folding solar panels are known in the art. A typical solar array of this type has a support, such as the body of the spacecraft, mounting a deployment boom which may be extended outwardly from one side of the support. Attached to the deployment boom is a folding solar panel composed of a number of panel sections hinged edge-to-edge along hinge lines extending normal to extension axis of the boom. The two end panel sections are attached, respectively, to the support and to a cross-member at the outer end of the boom. In the stowed configuration of the solar array, the deployment boom is retracted to locate the cross-member adjacent the support, and the solar panel sections are folded accordian-fashion into confronting face-to-face relation flat against the side of the support. During deployment, the boom is extended outwardly from the support to unfold the solar panel to a deployed configuration wherein the panel sections are disposed edge-to-edge substantially in a common plane containing the boom.

SUMMARY OF THE INVENTION

The present invention provides an improved deployable panel structure for a solar array and other uses having a deployment boom mounted on a support, such as the body of a spacecraft, and a folding panel attached to the deployment boom. The panel is divided into a number of folding panel sections hinged edge-to-edge along hinge lines extending normal to the extension of the deployment boom. The deployment boom is attached to the folding panel for extension of the panel with the boom from a stowed configuration, wherein the panel sections are folded accordian-fashion into a confronting face-to-face relation flat against the adjacent side of the support, to a deployed configuration, wherein the panel sections are disposed edge-to-edge substantially in a common plane containing the deployment boom. On the outer end of the boom is a crossbar which presses against the outer section of the panel in its folded configuration.

A primary feature of the invention resides in novel selcoiling panel retaining springs which cooperate with the deployment boom crossbar to firmly retain the folded panel sections of the stowed panel against flapping, buckling, the other undesirable motion when the panel structure is subjected to loading, such as is encountered during the launch and boost phases of a spacecraft. These retaining springs comprise spring strips, such as Negators, which are preformed to roll up or coil endwise by elastic strain energy. The outer ends of the springs are secured to the panel support along the hinged edges of the folded panel sections in a manner such that the springs may be unrolled inwardly across the outermost panel section toward the deployment boom crossbar.

The boom crossbar is provided with means which engage the inner ends of the uncoiled springs to retain the latter in their uncoiled configuration wherein the springs press against the folded panel sections to firmly hold the latter in fixed position. Initial extension movement of the boom releases the springs to roll up or coil outwardly to retracted positions wherein the springs clear the folded panel for deployment with the boom.

BRIEF DESCRIPTION OF THE DRAWINGS

In the drawings:
FIG. 4 is a top view of the spacecraft with the panel structures partially deployed;
FIG. 5 is an enlarged section taken on line 5—5 in FIG. 1;
FIG. 6 is an enlarged section taken on line 6—6 in FIG. 2;
FIG. 7 illustrates an alternative form of panel retaining spring;
and
FIG. 8 illustrates a further alternative form of panel retaining spring.

DESCRIPTION OF THE PREFERRED EMBODIMENTS

Figure 1:
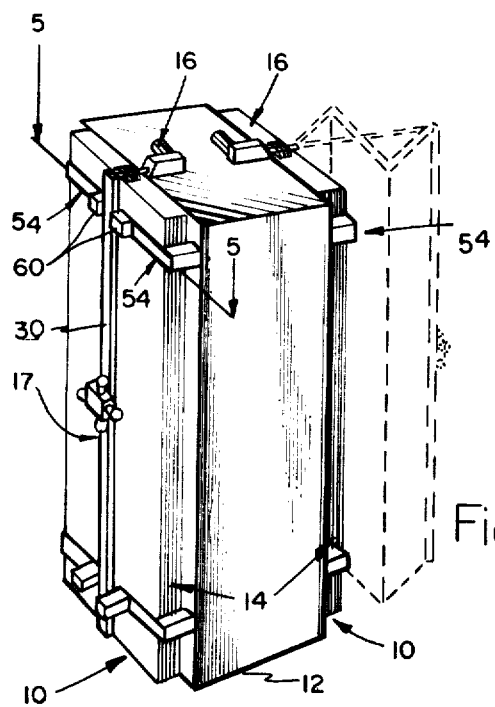
FIG. 1 illustrates a spacecraft equipped with a pair of the present deployable panel structures.
Figure 2:
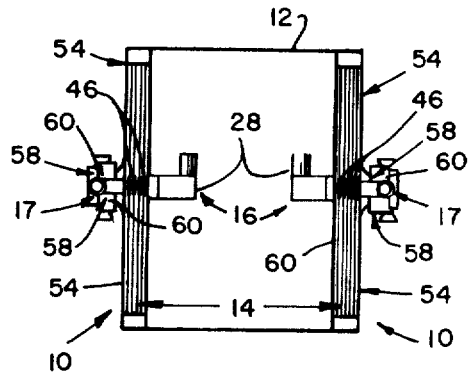
FIG. 2 is a top view of the spacecraft.
Figure 2A:
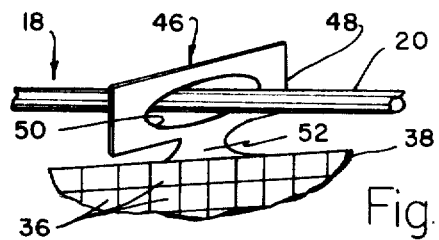
FIG. 2a is a fragmentary detail of a panel structure.
Figure 3:
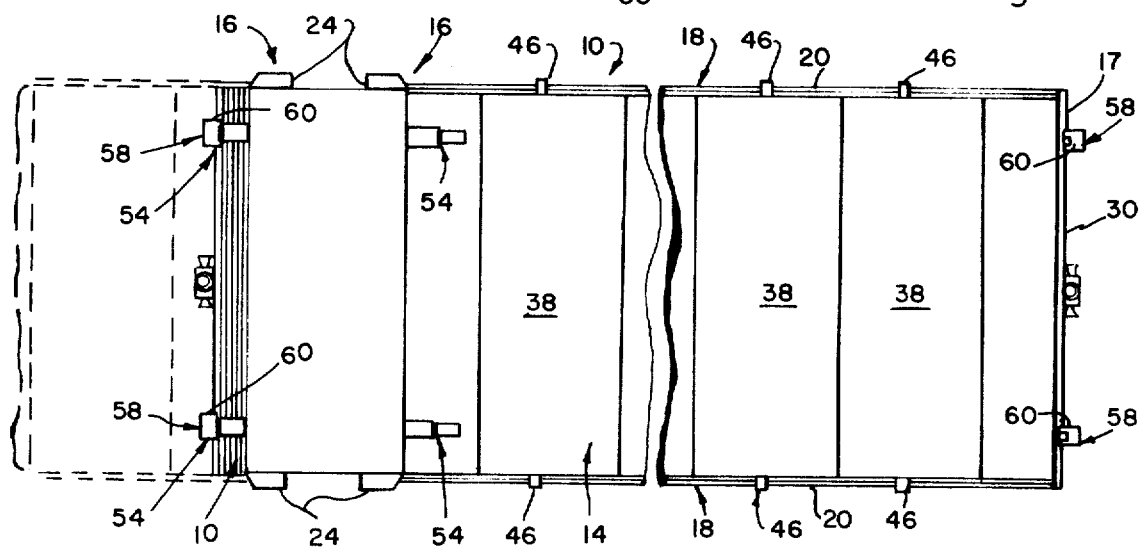
FIG. 3 is a side elevation of the spacecraft showing one panel structure stowed and the other deployed.

The drawings illustrate a pair of folding deployable solar arrays 10 according to the invention mounted on a support 12. In this case, the support is the body of the spacecraft. Each solar array 10 has a folding solar panel 14 and a deployment mechanism 16 for the panel. This deployment mechanism includes a deployment boom 17. As will appear from the ensuing description, the invention may utilize any suitable type of deployment boom.

The illustrated deployment boom 17 comprises a pair of so-called linear extenders 18 each having a beam 20 in the form of a strip of spring metal which is stressed to curl laterally into a tubular configuration having its central axis parallel to the longitudinal axis of the strip. The inner end of the beam 20 is secured to a reel 22 rotatably mounted within a housing 24 on the spacecraft 12. The free end of the beam extends from the housing through a cylindrical exit guide 26. The reel 22 is driven by a reversible electric motor 28. Extending between and joining the outer ends or tips of the beams 20 is a cross-member 30.

The reels 22 of the linear extenders 18 are rotatable by their respect motors 28 to extend and retract the beams 20 relative to the spacecraft 12. The motors are synchronized to effect such extension and retraction of the beams in unison. In their extended positions, the beams 20 extend outwardly in parallel relation beyond one side of the spacecraft 12. In their retracted positions, the beams strips are wound in flat condition on their reels 22 to locate the cross-member 30 in close proximity to the adjacent side of the spacecraft 12.

The solar panel 14 of each solar array is divided into panel sections 38 hinged edge-to-edge along hinge lines 40 normal to the longitudinal edges of the panel and to the booms 20. Panel sections 38 comprise substrates of thin-film sheet material, such as Mylar or Kapton, to which are secured solar cells 36. The substrates of adjacent panel sections are joined by tape or other hinge means.

The inner end of each solar panel 34 is attached to the adjacent side of the spacecraft 12 along an inner hinge line parallel to the intervening hinge lines 40. The outer end of the panel is attached to the respective boom cross-member 30 along an outer hinge line parallel to the intervening hinge lines.

Each solar panel 14 is attached to its deployment boom 17 by projecting tabs 46 along the edges of the solar panels sections 38 which coincide with the longitudinal margins of the solar panel 14 and parallel the extender beams 20. These boom attachment tabs are integral extensions of the panel section substrates. Each tab has an outer apertured portion 48 containing an opening 50 and a neck portion 52 joining the outer portion to the respective panel section 38.

The outer opening 50 in each tab 46 slidably receives the adjacent extender beam 20. The inner neck portion 52 of each tab is relatively narrow, such that it may twist freely to permit folding rotation of its panel section 38 relative to the adjacent beam 20 during storage and deployment of the solar array in the manner hereinafter described. Tabs 46 have a generally T- shaped. In this regard, it will be observed that the outer portion 48 of each tab is elongated in the lengthwise direction of the solar panel 14 and the extender beams 20. The opening 50 in each tab is similarly elongated in lengthwise direction of the solar panel and beams and thus has a generally oval shape. The inner neck portion 52 of each tab is reduced in width and extends from the center of its respective outer tab portion, along the center line of the adjacent solar panel section 38.

Each solar array 10 is retractable and extendable relative to the spacecraft 12 between stowed and deployed configurations. In the stowed configuration of each solar array, its deployment boom 17 is retracted to a position wherein the boom cross-member 30 is located in close proximity to the adjacent side 30 of the spacecraft. In this configuration, the solar panel 14 of the array is folded accordian-fashion to locate the solar panel sections 38 in confronting face-to-face relation flat against the adjacent side of the spacecraft 12. The cross-member 30 presses inwardly against the outer most panel section to retain the panel sections in their folded configuration. Deployment of each solar array 10 is accomplished by extending its deployment boom 17 outwardly from the spacecraft. In the fully deployed configuration of the solar array, its solar panel sections 38 are disposed in edge-to-edge relation substantially in a common plane containing the extended deployment boom.

According to the present invention, self-coiling panel retaining springs 54 are provided for firmly holding the folded panel sections 38 in fixed position when the solar arrays 10 are stowed. These springs restrain the panel sections against flapping, buckling, and vibrating extensively during launch and boost of the spacecraft 12 into orbit. Each spring 54 comprises a spring strip, such as Negator, which is preformed to normally roll up by elastic strain energy into a tight coil 56. The outer ends of the springs are fixed to the spacecraft 12 along the hinged edges of the folded panel sections 38, two at each side of the deployment boom cross-member 30, in a manner such that the springs may be unrolled inwardly across the outermost panel section toward the cross-member.

Each deployment boom cross-member 30 comprises a rigid bar having means 58 for engaging the inner ends of its panel retaining springs 54 to retain the latter in their unrolled or uncoiled panel retaining configuration when the solar array 10 is stowed. In the particular inventive embodiment under discussion, the spring engaging means 58 comprise cups 60 which are fixed to opposite sides of the crossbar 30 and receive coils at the inner ends of the springs. When the springs 54 are unrolled to their panel retaining configuration, the springs press against the folded solar panel sections 38 and curl laterally to provide the springs with the moment of inertia or stiffness required to firmly hold the folded panel sections in fixed position. Foam pads 61 may be fixed to the panel engaging sides of the springs to protect the solar panel, retain the transverse spring curvature, and increase their stiffness.

Each solar array 10 is maintained in its stowed configuration during launch and boost of the spacecraft 12 into orbit. The deployment boom crossbar 30 and retaining springs 54 then cooperate to firmly hold the folded solar panels 14 against flapping, buckling, or extensive vibration under the loads imposed on the panels. After orbit is achieved, the deployment booms 17 are extended to deploy the solar panels 14. During initial extension movement of the booms, the retaining cups 60 on the boom crossbars 30 release the coiled inner ends of the panel retaining springs 54. The released springs then coil or roll up in the direction of their fixed outer ends, under the action of the elastic strain energy in the springs, to retracted positions wherein the spring coils 56 clear the folded solar panels 14 for extension with the deploying booms.

FIG. 7 illustrates a modified retaining means 62 for each panel retaining spring 54. This modified retaining means comprises a triangular block 64 fixed to the inner end of the spring and a V-block 66 fixed to the boom cross-member 30 for receiving the triangular block in the stowed configuration of the solar array. This type of retaining means has the advantage that if the launch and boost loads imposed on the spring 54 cause the latter to flatten out laterally and thereby lose its stiffness, the spring continues to serve as a tension band for firmly holding the folded solar panel 14. Other retaining means, such as a pin on the boom crossbar engaging in a hold in the inner end of the spring may be employed with the same advantage.

FIG. 8 illustrates a modified panel retaining spring arrangement wherein the inner ends of the panel retaining springs 68 at each side of the deployment boom crossbar 30 are joined by a roll-up tie bar 70. When the solar array is stowed, tie bars 70 are fixed to the boom crossbar by a shear clip 71. A pyrotechnic shear device 72 is provided for shearing the clip just prior to deployment. This action releases the tie bars 70 to roll up with the springs 68. The advantage of this embodiment resides in the fact that the springs at each side of the boom crossbar 30 are forced to roll up to their retracted positions in unison.

What is claimed as new in support of letters patent is:

1. A deployable panel structure comprising:
   a support;
   a deployment mechanism on said support including a deployment boom mounting a cross-member at its outer end and means for moving said boom longitudinally between a retracted position wherein said cross-member is located adjacent said support and an extended position wherein said boom projects beyond one side of said support;
   a folding panel supported by said boom including a number of rectangular panel sections hinged edge-to-edge along parallel hinge lines normal to said boom; the ends of said panel being hinged to said support and cross-member, respectively, along hinge lines parallel to said first mentioned hinge lines, such that said panel is retractable with said boom to a folded configuration wherein said panel sections are disposed in confronting face-to-face relation against said support, and said panel is extendable with said boom to a deployed configuration wherein said panel sections are disposed substantially in a common plane containing said boom;
   means slidably supporting said panel sections on said boom in such a way as to permit folding and unfolding rotation of said sections relative to said boom during extension and retraction;
   at least one panel retaining roll-up spring at each side of said cross-member having an outer end fixed to said support along the hinged edges of said panel sections in the folded configuration of said panel in a manner such that each spring may be unrolled flat across the outermost panel section to said boom cross-member;
   said springs comprising elastic bands which are preformed to roll up in the directions of their fixed outer ends to retracted positions wherein said springs clear said panel for deployment with said boom; and
   coacting retaining means on said cross-member and the inner ends of said springs for retaining said springs in their unrolled configurations when said boom is retracted to hold the folded panel sections firmly against said support and releasing said springs to roll up to their retracted positions upon initial extension movement of said boom.

2. A panel structure according to claim 1 wherein:
   said retaining means comprise cups in said cross-member receiving coils at the inner ends of said springs.

3. A panel structure according to claim 1 wherein:
   said retaining means are arranged to resist tension forces in said springs.

4. A panel structure according to claim 3 wherein:
   said retaining means comprise triangular blocks fixed to the inner ends of said springs, and V-blocks on said cross-member for receiving said triangular blocks.

5. A panel structure according to claim 1 wherein:
   there are a pair of said springs at each side of and spaced along said cross-member.

6. A panel structure according to claim 5 including:

means joining the inner ends of the springs at each side of said cross-member for causing the latter springs to roll up in unison; and said retaining means holds both spring pairs in their unrolled configuration.

7. A panel structure according to claim 6 wherein:

said spring joining means for each spring pair comprises a tie bar; and said retaining means engages said tie bars.

8. A panel structure according to claim 1 wherein:

said support is a spacecraft, and said panel structure is a solar array.

9. A panel structure according to claim 8 including:

resilient pads secured to the panel engaging sides of said springs.

* * * * *

UNITED STATES PATENT AND TRADEMARK OFFICE
CERTIFICATE OF CORRECTION

PATENT NO. : 3,677,508
DATED : July 18, 1972
INVENTOR(S) : Paul A. Dillard et al It is certified that error appears in the above-identified patent and that said Letters Patent are hereby corrected as shown below:

Column 3, Line 1    change "shaped" to --shape--

Column 4, Line 6    change "hold" to --hole--

Signed and Sealed this

Fifteenth Day of February 1977

[SEAL]

Attest:

RUTH C. MASON
*Attesting Officer*

C. MARSHALL DANN
*Commissioner of Patents and Trademarks*